United States Patent [19]

Sakabe et al.

[11] Patent Number: 4,661,462

[45] Date of Patent: Apr. 28, 1987

[54] DIELECTRIC CERAMIC COMPOSITION

[75] Inventors: Yukio Sakabe, Funai; Goro Nishioka, Yawata; Junichi Imanari, Nagaokakyo, all of Japan

[73] Assignee: Murata Manufacturing Co., Ltd., Japan

[21] Appl. No.: 741,687

[22] Filed: Jun. 6, 1985

[30] Foreign Application Priority Data

Jun. 13, 1984 [JP] Japan .............................. 59-122677

[51] Int. Cl.$^4$ ............................................ C04B 35/46
[52] U.S. Cl. .................................. 501/134; 501/135; 501/136
[58] Field of Search ................... 501/134, 135, 136; 361/320, 321

[56] References Cited

FOREIGN PATENT DOCUMENTS

| 49-4280 | 1/1974 | Japan | 501/134 |
| 110499 | 8/1979 | Japan | 501/134 |
| 47-18511 | 5/1982 | Japan | 501/134 |
| 59-196503 | 11/1984 | Japan | 501/134 |
| 60-33258 | 2/1985 | Japan | 501/134 |
| 60-33257 | 2/1985 | Japan | 501/134 |
| 60-46966 | 3/1985 | Japan | 501/134 |
| 60-151272 | 8/1985 | Japan | 501/134 |

Primary Examiner—William R. Dixon, Jr.
Assistant Examiner—A. Knab
Attorney, Agent, or Firm—Ostrolenk, Faber, Gerb & Soffen

[57] ABSTRACT

A dielectric ceramic composition of a ternary system $Pb(Ni_{\frac{1}{3}}Nb_{\frac{2}{3}})O_3$—$PbTiO_3$—$Pb(Zn_{\frac{1}{2}}W_{\frac{1}{2}})O_3$ comprises a solid solution having a composition represented by the general formula:

$$xPb(Ni_{\frac{1}{3}}Nb_{\frac{2}{3}})O_3\text{—}yPbTiO_3\text{—}zPb(Zn_{\frac{1}{2}}W_{\frac{1}{2}})O_3$$

wherein x, y and z are mole fractions of respective three components, and $x+y+z=1.00$, the composition falling in a compositional area defined by a polygon encompassed by the points A, B, C and D in FIG. 1. The sets of mole fractions of the three components at the points are as follows:

|   | x | y | z |
|---|---|---|---|
| A | 0.87 | 0.125 | 0.005 |
| B | 0.40 | 0.15 | 0.45 |
| C | 0.30 | 0.35 | 0.35 |
| D | 0.62 | 0.375 | 0.005 |

9 Claims, 1 Drawing Figure

DIELECTRIC CERAMIC COMPOSITION

FIELD OF THE INVENTION

The present invention relates to a dielectric ceramic composition and, more particularly, a dielectric ceramic composition with a high dielectric constant that can be sintered at a relatively low temperature.

BACKGROUND OF THE INVENTION

As a high permittivity dielectric ceramic composition for ceramic capacitors, there have been used those mainly comprising barium titanate and including one or more components such as stannate, zirconates and other titanates.

Since such barium titanate ceramic compositions have a high sintering temperature ranging from 1300° to 1400° C., large amounts of energy are required for sintering, resulting in an increase in costs of ceramic products. In addition, when manufacturing monolithic capacitors with these ceramic compositions, it is required to use a noble metal with a high melting point such as, for example, palladium or platinum as a material for internal electrodes to prevent the electrode material from oxidation and reaction with dielectrics. Accordingly, it is impossible with these ceramic compositions to reduce the cost of ceramic capacitors.

SUMMARY OF THE INVENTION

It is an object of the present invention to provide a dielectric ceramic composition with a high dielectric constant that can be sintered at a relatively low temperature.

Another object of the present invention is to provide a dielectric ceramic composition having a high dielectric constant of not less than 8000 and a low sintering temperature of not more than 1100° C.

According to the present invention, these and other objects are solved by providing a dielectric ceramic composition of a ternary system $Pb(Ni_{\frac{1}{3}}Nb_{\frac{2}{3}})O_3$—$PbTiO_3$—$Pb(Zn_{\frac{1}{3}}W_{\frac{1}{3}})O_3$ comprising a solid solution having a composition represented by the general formula:

$$xPb(Ni_{\frac{1}{3}}Nb_{\frac{2}{3}})O_3-yPbTiO_3-zPb(Zn_{\frac{1}{3}}W_{\frac{1}{3}})O_3$$

wherein x, y and z are mole fractions of respective components, and $x+y+z=1.00$ said composition falling in a compositional area defined by a polygon ABCD encompassed by the points A, B, C and D in FIG. 1, the sets of mole fractions of the three components at said points being as follows:

|   | x | y | z |
|---|---|---|---|
| A | 0.87 | 0.125 | 0.005 |
| B | 0.40 | 0.15 | 0.45 |
| C | 0.30 | 0.35 | 0.35 |
| D | 0.62 | 0.375 | 0.005 |

The compositional area of the composition of the present invention has been limited as being in the area defined by the polygon ABCD for the following reasons. If the composition falls in any point outside of the side AB or BC, the dielectric constant become small and less than 8000. If the composition falls in any point outside of the side CD, the dielectric constant becomes less than 8000 and the dissipation factor becomes large and more than 2%. If the composition falls in any point outside of the side DA, the sintering temperature becomes large and more than 1100.

The invention will be further apparent from the following description with reference to examples and the accompanying drawing.

EXAMPLES

Figure 1:
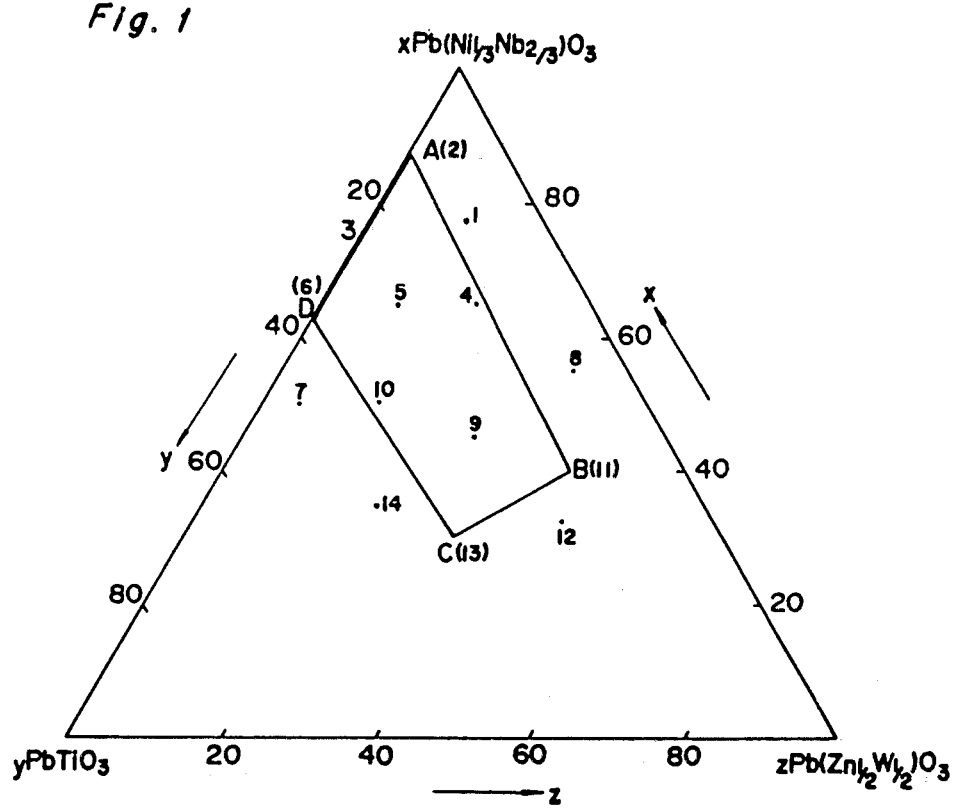
FIG. 1 is a triangular diagram showing a compositional area of the dielectric ceramic composition of the present invention.

As starting materials, there were prepared $Pb_3O_4$, NiO, $Nb_2O_3$, $TiO_2$, ZnO and $WO_3$. These materials were weighed and mixed to prepare a mixture having compositional proportion shown in Table 1. The mixture was milled by the wet process for 5 to 20 hours, dried, and then calcined at 650° C. for 2 hours. The resultant presintered body was crushed, milled and then granulated with a binder (3% by weight of polyvinyl alcohol). The thus prepared granules were pressed into disks with a diameter of 12 mm and a thickness of 1 mm under a pressure of 2000 kg/cm². The disks were fired with an electric furnace in a lead atmosphere at a temperature of 900° to 1100° C. for 2 hours. To prepare test specimens for measurements of electrical properties, silver paste was applied on opposed surfaces of the resultant ceramic disk and then baked at 950° C. to form electrodes thereon.

The measurements were made on dielectric constant ($\epsilon$) and dielectric loss (tan $\delta$) under the conditions of a temperature of 25° C., a voltage of 1 Vrms and a frequency of 1 KHz. Results are shown in Table 1. In the table, the specimens with an asterisk (*) are those have a composition beyond the scope of the present invention.

TABLE 1

| Specimen No. | Composition | | | Sintering temp. (°C.) | dielectric constant | tan δ (%) |
|---|---|---|---|---|---|---|
|   | x | y | z |   |   |   |
| 1* | 0.80 | 0.075 | 0.125 | 1060 | 4500 | 1.20 |
| 2 | 0.87 | 0.125 | 0.005 | 1100 | 9800 | 0.06 |
| 3* | 0.75 | 0.25 | 0.0 | 1250 | 12300 | 1.78 |
| 4 | 0.65 | 0.15 | 0.20 | 1040 | 9100 | 1.10 |
| 5 | 0.65 | 0.25 | 0.10 | 1060 | 19000 | 2.00 |
| 6 | 0.62 | 0.375 | 0.005 | 1100 | 11200 | 0.36 |
| 7* | 0.50 | 0.45 | 0.05 | 1060 | 5900 | 4.80 |
| 8* | 0.55 | 0.075 | 0.375 | 1000 | 3500 | 1.40 |
| 9 | 0.45 | 0.25 | 0.30 | 1000 | 13100 | 0.70 |
| 10 | 0.50 | 0.35 | 0.15 | 1040 | 10200 | 0.88 |
| 11 | 0.40 | 0.15 | 0.45 | 960 | 8100 | 0.65 |
| 12* | 0.325 | 0.20 | 0.475 | 940 | 4900 | 2.45 |
| 13 | 0.30 | 0.35 | 0.35 | 960 | 8400 | 1.43 |
| 14* | 0.35 | 0.425 | 0.225 | 1040 | 5000 | 5.20 |

As will be seen from the results for the specimens Nos. 1, 8 and 12, the composition outside of the side AB or BC possesses a dielectric constant of lower than 8000. From the results for the specimens Nos. 7 and 14, it can be seen that the composition outside of the side CD possesses the dielectric constant of less than 8000 and the dissipation factor (tan δ) of more than 2%. Also, from the results for the specimen No. 3, it will be seen that the ceramic composition outside of the side DA has a high sintering temperature of more than 1100° C.

From the results for specimens Nos. 2, 4, 5, 6, 9, 10, 11 and 13 of the present invention, it will be seen that the composition falling on the side AB, BC, CD, or DA or in the compositional area defined by the polygon ABCD possess a high dielectric constant of not less than 8000 and a low dielectric tangent loss of less than 2%. Also, it will be seen that the composition falling in the polygon can be sintered at a low temperature of not more than 1100° C.

As can be seen from the above, the dielectric ceramic composition of the present invention possesses a high dielectric constant more than 8000 and can be sintered at a low sintering temperature of less than 1100° C., thus making it possible to reduce the cost of ceramic capacitors. In addition, since the sintering temperature is not more than 1100° C., the dielectric ceramic composition of the present invention makes it possible to use an inexpensive conductive material such as silver or its alloy as an internal electrodes. According to the present invention, it is possible to manufacture inexpensive ceramic capacitors which are small in size but large in capacity.

What I claim is:

1. A dielectric ceramic composition of a ternary system $Pb(Ni_{\frac{1}{3}}Nb_{\frac{2}{3}})O_3$—$PbTiO_3$—$Pb(Zn_{\frac{1}{2}}W_{\frac{1}{2}})O_3$ consisting essentially of a solid solution having a composition represented by the general formula:

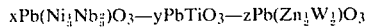
$xPb(Ni_{\frac{1}{3}}Nb_{\frac{2}{3}})O_3$—$yPbTiO_3$—$zPb(Zn_{\frac{1}{2}}W_{\frac{1}{2}})O_3$ wherein x, y and z are mole fractions of the respective three components, and $x+y+z=1.00$, said composition falling in a compositional area defined by a polygon ABCD encompassed by the points A, B, C and D in FIG. 1, the sets of mole fractions of the three components at said points being as follows:

|   | x | y | z |
|---|---|---|---|
| A | 0.87 | 0.125 | 0.005 |
| B | 0.40 | 0.15 | 0.45 |
| C | 0.30 | 0.35 | 0.35 |
| D | 0.62 | 0.375 | 0.005 | said composition having a dielectric constant of not less than 8000 and a sintering temperature of not more than 1100 degrees C.

2. A dielectric ceramic composition according to claim 1 in which x is 0.87, y is 0.125 and z is 0.005.

3. A dielectric ceramic composition according to claim 1 in which x is 0.65, y is 0.15 and z is 0.20.

4. A dielectric ceramic composition according to claim 1 in which x is 0.65, y is 0.25 and z is 0.10.

5. A dielectric ceramic composition according to claim 1 in which x is 0.62, y is 0.375 and z is 0.005.

6. A dielectric ceramic composition according to claim 1 in which x is 0.45, y is 0.25 and z is 0.30.

7. A dielectric ceramic composition according to claim 1 in which x is 0.50, y is 0.35 and z is 0.15.

8. A dielectric ceramic composition according to claim 1 in which x is 0.40, y is 0.15 and z is 0.45.

9. A dielectric ceramic composition according to claim 1 in which x is 0.30, y is 0.35 and z is 0.35.

* * * * *